United States Patent [19]

Jarret et al.

[11] Patent Number: 5,082,377
[45] Date of Patent: Jan. 21, 1992

[54] OPTICAL FIBER CONNECTOR ENDPIECE, A METHOD OF ASSEMBLING IT, AND A METHOD OF CONNECTING TWO OPTICAL FIBERS USING SUCH ENDPIECES

[75] Inventors: Bertrand Jarret, Osny; Joël Legrand, Mitry Mory, both of France

[73] Assignee: Cegelec, Levallois-Perret, France

[21] Appl. No.: 547,274

[22] Filed: Jul. 3, 1990

[30] Foreign Application Priority Data

Jul. 3, 1989 [FR] France .................. 89 08889

[51] Int. Cl.⁵ .......................... G02B 6/36; G02B 7/26
[52] U.S. Cl. ........................................ 385/60; 385/80
[58] Field of Search ........................... 350/96.20, 96.21

[56] References Cited

U.S. PATENT DOCUMENTS 4,787,699  11/1988  Moulin ..................... 350/96.21

FOREIGN PATENT DOCUMENTS 43585    1/1982  European Pat. Off. .
0043585  1/1982  European Pat. Off. .
8604156  7/1986  PCT Int'l Appl. .
8707035  11/1987 PCT Int'l Appl. .
8604156  7/1988  PCT Int'l Appl. .
1599885  10/1981 United Kingdom .

OTHER PUBLICATIONS

Patent Abstracts of Japan, vol. 11, No. 32 (P-541)[2479], Jan. 30, 1987.

Primary Examiner—William L. Sikes
Assistant Examiner—Robert E. Wise
Attorney, Agent, or Firm—Sughrue, Mion, Zinn Macpeak & Seas

[57] ABSTRACT

A connector endpiece for interconnecting two optical fibers end-to-end, the endpiece comprising a cylindrical body (1) provided with an axial bore (2) for receiving the end of one of the optical fibers to be connected (5), and having a polished plane front face for fixing in one half of the bore of a hollow connection sleeve (13) face-against-face with an identical connector endpiece housing the end of the other optical fiber (5A), the endpiece being characterized in that it further comprises a short optical element (7) of material having the same refractive index as that of the optical fibers to be interconnected, having a plane rear face (9) and having a front face presenting excellent surface state (8; 11), said element being disposed in the front portion of the bore of the endpiece in such a manner that the rear face of the element is close to the front end (6) of the corresponding optical fiber, and the front end of the element is flush with the polished plane front face (3) of the endpiece, a thin layer (10) of adhesive material having the same refractive index as the optical fibers to be interconnected being disposed between the front face of the optical fiber and the rear face of the short optical fiber element. The invention also relates to methods of assembling such an endpiece and of interconnecting two optical fibers using such endpieces.

7 Claims, 2 Drawing Sheets

OPTICAL FIBER CONNECTOR ENDPIECE, A METHOD OF ASSEMBLING IT, AND A METHOD OF CONNECTING TWO OPTICAL FIBERS USING SUCH ENDPIECES

The present invention relates to a connector endpiece for interconnecting two optical fibers end-to-end, the endpiece comprising a cylindrical body provided with an axial bore for receiving the end of one of the optical fibers to be connected, and having a polished plane front face for fixing in one half of the bore of a hollow connection sleeve face-against-face with an identical connector endpiece housing the end of the other optical fiber. It is more particularly applicable to optical fiber connection endpieces made of plastic material. The invention also covers a method of assembling such endpieces and a method of connecting two optical fibers by means of such endpieces.

When it is desired to connect two optical fibers end-to-end, it is necessary for their front surfaces to be perpendicular to their axes and very well polished (with any remaining surface irregularities being about one tenth of a micron to avoid large transmission losses). Methods and devices are known for this purpose, but they are difficult to use on site, given the required accuracy.

The object of the present invention is to provide a connection endpiece and a method of assembling the endpiece which ensure low connection losses while still being usable on site.

The endpiece of the invention is characterized in that it further comprises a short optical element of material having the same refractive index as that of the optical fibers to be interconnected, having a plane rear face and having a front face presenting excellent surface state, said element being disposed in the front portion of the bore of the endpiece in such a manner that the rear face of the element is close to the front end of the corresponding optical fiber, and the front end of the element is flush with the polished plane front face of the endpiece, a thin layer of adhesive material having the same refractive index as the optical fibers to be interconnected being disposed between the front face of the optical fiber and the rear face of the short optical fiber element.

In a first variant of the invention, the front face having excellent surface state of the short optical fiber element is plane.

In another variant, the front face having excellent surface state of the short optical fiber element has a spherical convex shape. In this case, the divergence of the radiation transmitted outwards from the front face is reduced, thereby making it possible to accept a larger gap between the front faces of the two optical fiber elements without increasing transmission losses.

The method of assembling a connection endpiece of the invention is characterized in that a short optical element is inserted into the bore of the cylindrical body from its end having the polished plane front face, the element having a plane rear face and a front face having excellent surface state, its refractive index being the same as that of the fibers to be interconnected, the element being inserted so that its front face lies flush with the polished plane front face of the cylindrical body, in that a thin layer of adhesive material having a refractive index equal to that of the optical fibers to be interconnected is disposed on the front face of the optical fiber, and in that the front end of the optical fiber to be interconnected is inserted until it comes into abutment against the rear face of the optical element.

Preferably, the front end of the optical fiber to be interconnected is inserted until it comes into contact with the optical element, and is fixed in such a manner as to maintain said contact.

Advantageously, a liquid resin polymerizable under ultraviolet radiation is used as the adhesive material, and the cylindrical body is made of a material transparent to said radiation. After the front end of the optical fiber to be interconnected has been inserted, the endpiece is subjected to ultraviolet radiation.

Connector devices including end fittings of the invention are described below by way of example and with reference to the figures of the accompanying drawings.

Figure 1:
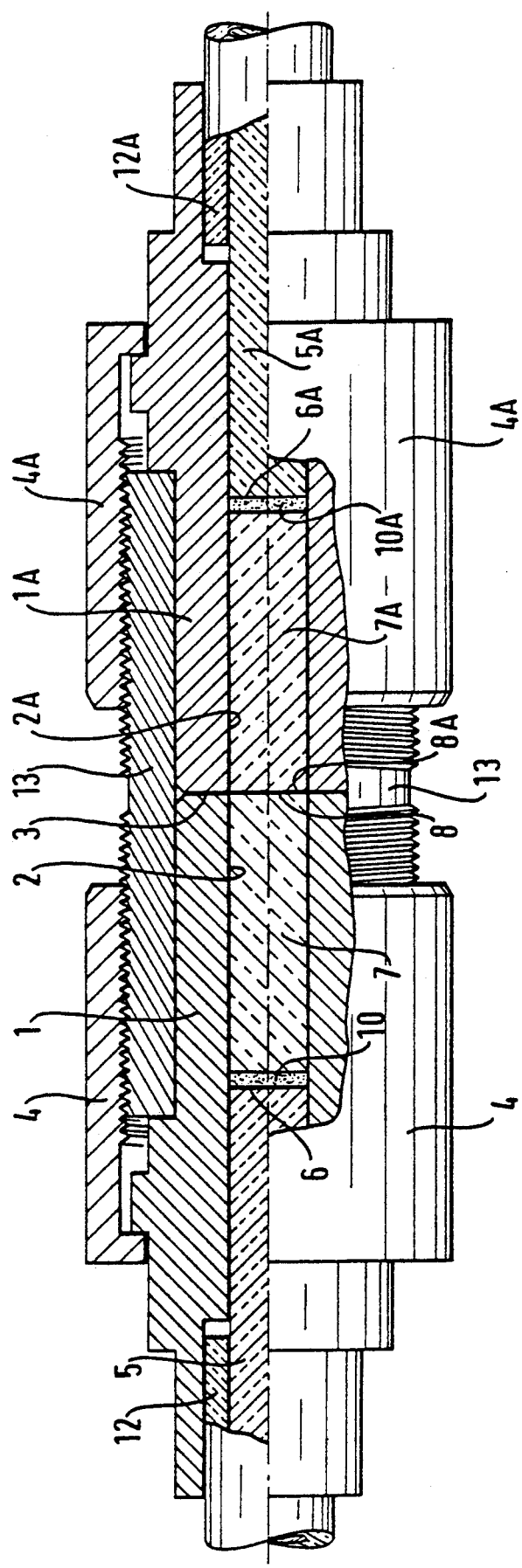
FIG. 1 is an elevation view in partial section of a connector device comprising two connection endpieces in which each short optical element has a plane front face, the endpieces being shown assembled.

In FIG. 1, the cylindrical body 1 of the left endpiece having an outside thread is pierced by a bore 2. Its front face 3 perpendicular to its axis is plane and polished. A nut-forming ring 4 is fixed on its rear end.

In order to connect optical fibers, a relatively short optical fiber element 7 is inserted in the front portion of the bore 2, the diameter of said element being very close to the inside diameter of the bore and its front face 8 being carefully disposed perpendicularly to its axis and polished in the factory to avoid any surface irregularity of size greater than 0.2 microns. Its refractive index is equal to that of the optical fibers to be connected. An optical fiber to be connected 5 is then inserted from the rear end of the bore 2, with the covering 12 of the fiber being removed over a certain distance from its end so as to enable bare fiber to be inserted into the bore, while its front end has been cut without taking special precautions to obtain a face 6 which is relatively irregular and roughly perpendicular to its axis, said face then being covered with a thin layer of polymerizable liquid resin 10. Since the front face 8 of the optical fiber element 7 is held in the plane of the front face 3 of the endpiece 1, the optical fiber 5 is caused to abut with a small amount of pressure against the rear face 9 of the element 7 and is separated therefrom by a thin layer of polymerizable liquid resin, and is preferably subsequently kept in contact with said rear face. The resin is then polymerized, either by catalysis or else by ultraviolet radiation, assuming the endpiece 1 is made of a material which is transparent to ultraviolet radiation.

The same is done for a symmetrical endpiece 1A which is provided in its bore 2A with an optical element 7A and an optical fiber 5A, with the end of the covering 12A being likewise removed and the front end being cut without taking special precautions to obtain a face 6A which is likewise coated with a thin layer of liquid polymerizable resin 10A. The procedure is then the same as for the optical fiber 5. The front faces of the endpieces 1 and 1A are brought into contact. A connection sleeve 13 having an outside thread is then disposed around the ends of the endpieces and the nut rings 4 and 4A are screwed onto the sleeve.

Figure 2:
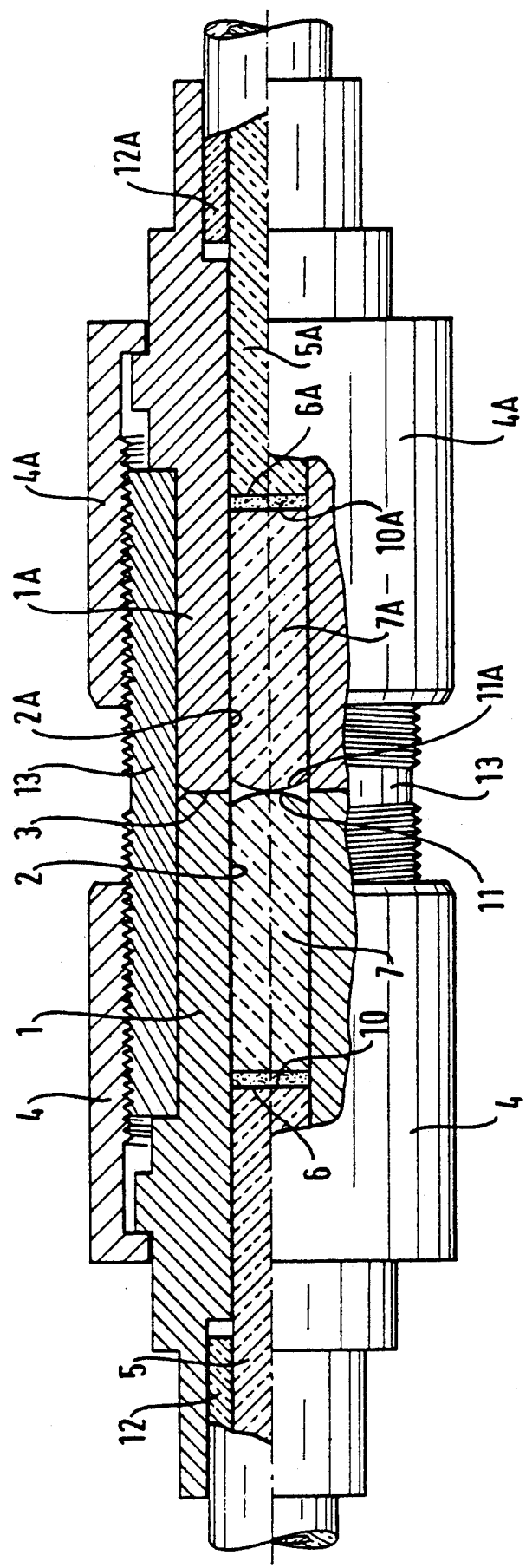
FIG. 2 is an elevation view in partial section through a connector device comprising two endpieces in which each short optical element has a spherically-shaped convex front face.

As shown in FIG. 2, it is also possible to cause the front ends 11 and 11A of the optical fiber elements 5 and 5A to be spherically convex in shape. This reduces the divergence of radiation at the ends of the elements, thereby further reducing transmission losses.

The optical fibers are connected in the same way as described above with reference to FIG. 1.

It will be understood that having such optical fiber elements available on site with surfaces of accurately defined shapes that are polished and manufactured in the factory makes it possible to avoid any operations of truing and polishing the ends of the optical fibers, which is particularly difficult to achieve on site, and also to avoid the relatively high transmission losses through the connection to which they give rise.

The use of endpieces of the invention is particularly advantageous for interconnecting optical fibers made of plastic material, but it is also usable for interconnecting optical fibers made of glass or silica.

We claim:

1. In a connector endpiece for interconnecting two optical fibers end-to-end, the endpiece comprising a cylindrical body (1) provided with an axial bore (2) for receiving the end of one of the optical fibers to be connected (5), and having a polished plane front face for fixing in one half of the bore of a hollow connection sleeve (13) face-against-face with an identical connector endpiece housing the end of the other optical fiber (5A), the improvement wherein the endpiece further comprises an optical element (7) of material having the same refractive index as that of the optical fibers to be interconnected, having a plane rear face (9) and having a polished front face (8; 11), said element being disposed in the front portion of the bore of the endpiece in such a manner that the rear face of the element is in contact with the front end (6) of the corresponding optical fiber, and the front end of the element is flush with the polished plane front face (3) of the endpiece, a layer (10) of adhesive material having the same refractive index as the optical fibers to be interconnected being disposed between the front face of the optical fiber and the rear face of the optical fiber element.

2. An endpiece according to claim 1, wherein the front face of the optical fiber element is plane.

3. An endpiece according to claim 1, wherein the front face of the optical fiber element has a spherical convex shape.

4. A method of assembling a connection endpiece for connecting two optical fibers end-to-end, the endpiece comprising a cylindrical body (1) provided with an axial bore (2) for receiving the end of one of the optical fibers to be connected (5), and a polished plane front face for fixing in one half of the bore a hollow connection sleeve (13) in face-against-face contact with an identical connector endpiece housing the end of the other optical fiber (5A), said method comprising inserting an optical element (7) into the bore of the cylindrical body from an end thereof having a polished plane front face (3), said element having a plane rear face (9) and a front face, the refractive index of said element being the same as that of the fibers to be interconnected, the method further comprising causing the element front face to lie flush with the polished plane front face (3) of the cylindrical body, disposing a layer (10) of adhesive material having a refractive index equal to that of the optical fibers to be interconnected on the front face (6) of the optical fiber, and inserting the front end of the optical fiber to be interconnected until the front end thereof comes into abutment against the rear face of the optical element.

5. A method according to claim 4, wherein the front end (6) of the optical fiber to be interconnected is inserted until the front end (6) comes into contact with the optical element (7), and said method further comprises fixing the optical fiber such as to maintain said contact with the optical element.

6. A method according to claim 4, wherein a liquid resin polymerizable under ultraviolet radiation is used as the adhesive material, and the cylindrical body (1) is made of a material transparent to said radiation, and said method further comprises subjecting the endpiece to ultraviolet radiation after the front end of the optical fiber to be interconnected has been inserted.

7. A method of interconnecting two optical fibers, by maintaining each of the optical fibers in a connector endpiece in accordance with the method of claim 4, and wherein said method further comprises pressing the two endpieces face-to-face, placing an externally threaded sleeve (13) over the ends of the endpieces at each end thereof, and then screwing respective nuts (4, 4A) onto said sleeve so as to hold each endpiece inside the sleeve.

* * * * *